Patent body 3,560,371
RECOVERY OF BITUMEN FROM BITUMINOUS SAND WITH CONTROL OF BITUMEN PARTICLE SIZE
Victor P. Kaminsky, Edmonton, Alberta, Canada, assignor to Cities Service Athabasca, Inc., Imperial Oil Limited, Atlantic Richfield Corporation, and Royalite Oil Company, Limited, fractional part interest to each
No Drawing. Filed June 17, 1968, Ser. No. 737,299
Int. Cl. C10g 1/04
U.S. Cl. 208—11                          5 Claims

ABSTRACT OF THE DISCLOSURE

Bitumen is recovered from an aqueous slurry of bituminous sand by introducing the slurry into a body of water in a separation zone. Bitumen floats to the top in the form of bituminous emulsion for recovery therefrom and sand settles to the bottom for removal therefrom. Sufficient shearing energy is imparted to the slurry during its introduction into the separation zone or while in the body of water in the separation zone to reduce the size of the particles of bitumen so that at least about 80% of the bitumen particles in the body of water are in the size range between about 50 and about 200 microns. The necessary shearing energy can be imparted by dispersing the slurry into the body of water through a high shear turbine impeller. Less than about 40% of the bitumen in the slurry introduced into the separation zone is usually in the form of particles in the 50 to 200 microns size range, prior to the application of shearing forces in accordance with the invention and for such slurry an energy input of between about 200 and about 2,000 ft.-lbs. of shearing energy per pound of slurry is usually sufficient to reduce the bitumen particles to the required size range.

---

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and the bitumen has an API gravity of about 8.0 degrees. This value for specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller-size mineral solid material is referred to as "fines." The fines contain clay and silt including some very small particles of sand. The fines content typically varies from about 10% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling in a body of water, to recover an emulsion, or froth, which contains some of the fines and quantities of coarse sand. Such an emulsion or froth is referred to herein as a bituminous emulsion.

One well-known method for preparing such emulsions is often referred to as the "hot-water process." In the hot-water process, the bituminous sand is slurried with steam and hot water and the pulp is then agitated with a stream of circulating hot water and carried to a separation cell maintained at an elevated temperature of about 180° F. In the separation cell, entrained air causes the bitumen to rise to the top of the cell in the form of an emulsion containing air, bitumen, water and mineral solids. The mineral solids are extremely difficult to separate from the bitumen and, unless the emulsion is further treated, it will generally contain at least 5% of mineral solids. This bituminous emulsion or froth can be subjected to water washing to effect a partial reduction in solids.

A bituminous emulsion, such as that obtained by the above-described procedures, often contains from about 10% to about 60% water, 5% to about 20% of mineral solids and from about 30% to about 85% bitumen. Usually, however, the bituminous emulsion or froth will contain, by weight, from about 25% to about 50% water, about 5% to about 12% mineral solids and about 35% to about 70% of bitumen.

Separation of water and mineral solids from the bituminous emulsion is necessary for most ultimate uses of the bitumen. A number of methods have been proposed for breaking bituminous emulsions and recovering the bitumen. One such method involves the use of thermal dehydration followed by cycloning as described in U.S. Pat. 3,338,814 to R. A. Given et al.

It has now been found that in processes such as the hot water process described above in which aqueous slurries of bituminous sand are introduced into water for separation and recovery of bitumen therefrom, improved results may be obtained if the particles of bitumen in the separation zone are reduced to smaller sizes than are usually present in such processes. In such processes, aqueous slurries of bituminous sand introduced into such separation zones typically have less than about 40% of the bitumen content in the form of particles between about 50 and about 200 microns in size. In accordance with the present invention, shearing forces are applied to the slurry of bituminous sand in the separation zone to reduce the size of the bitumen particles to between about 50 and about 200 microns. Sufficient shearing energy is preferably imparted to the slurry to insure that at least about 80% of the bitumen particles dispersed into the body of water are in the 50 to 200 micron size range. For typical slurries of the type described above, between about 200 and about 2,000 ft.-lbs. of shearing energy per pound of bitumen contained in the slurry is usually required to insure that at least 80% of the bitumen particles are in the 50 to 200 micron size range. Slurries suitable for use in practising the present invention frequently contain between about 5 and about 15 weight percent bitumen, between about 15 and about 30 weight percent water and between about 50 and about 85 weight percent solids.

Use of shearing energy to reduce bitumen particles or droplets to the desired size range as described herein results in improved recovery of bitumen and reduced contamination of recovered bitumen with solids. It has been found that bitumen particles substantially smaller than 50 microns will not float to the top of the body of water properly and therefore can become lost with sand tailings rather than recovered with bituminous froth while bitumen particles in excess of about 200 microns in size tend to trap too much water and entrain excessive amounts of solids in the bituminous emulsion.

In imparting shearing energy to the slurry to reduce bitumen particles to the desired size range mentioned above, it is essential that shearing energy be imparted in the separation zone and such energy is preferably imparted as part of the dispersion process by which the slurry is dispersed within the body of water in the separation zone. Shearing energy which may be imparted to the slurry prior to the separation zone, such as that used in forming the slurry or in adding flood water in accordance with conventional procedures at earlier stages in the process, does not accomplish the results desired and accomplished by the present invention. Shearing energy needed for control of particle size in the separation step is independent of any such energy imparted at an earlier stage of the process insofar as determining the size of bitumen particles dispersed in the body of water in the separation zone. It is believed that bitumen particles which may be broken up to the desired size range earlier in the process merely agglomerate into larger particles again before reaching the separation zone. Such reagglomeration of bitumen is minimized in practicing the present invention by applying the shearing energy as part of the process of dispersing the slurry throughout the cross-section of the body of water in the separation zone.

While any suitable means may be used to impart shearing energy to slurry in the separation zone and preferably during dispersion in the body of water as described above, such shearing energies can be conveniently imparted to the slurry by use of high shear turbine impellers. In such impellers, a rotating disk impeller having vanes thereon rotates within a stator designed so as to provide a shear zone between the impeller and the stator. The impeller may for instance have a solid bottom and raised notched lip around its circumference and may move within a stator having downwardly projecting notches around its circumference and be spaced from the stator just enough to produce the necessary shearing forces between the stator and the impeller. This applies both horizontal dispersing and shearing action to the slurry. Equipment suitable for this purpose is shown for instance in copending application of Lubomyr M. O. Cymbalisty entitled "Separation Vessel" and filed concurrently herewith.

EXAMPLE

An aqueous slurry of bituminous sand consisting of 10 weight percent bitumen, 20 weight percent water and 70 weight percent solids was introduced into a body of hot water maintained at a temperature of 150° F. for recovery of a bituminous emulsion therefrom in accordance with the general principles of a hot water type process as described above. In this particular example, a high shear turbine impeller of the type described above having a 2⅞ inch diameter impeller was used to disperse the slurry within the body of hot water and impart the desired shearing energies to the slurry at the same time. This was accomplished by positioning the impeller and stator portions of the dispersion mechanism in an intermediate portion of the body of water and feeding the slurry to the impeller at the rate of 270 lbs. per hour. By rotating the impeller at 500 r.p.m., adequate dispersion of slurry in the body of water was obtained and about 445 ft.-lbs. of shearing energy per pound of slurry was imparted to the slurry as it was being dispersed. In this particular turbine impeller, the clearance between the vanes of the rotating impeller and the walls of the stator was about ⅛ inch. Bituminous emulsion recovered from the top of the body of water in this example contained 76 weight percent bitumen, 18 weight percent water and 6 weight percent solids while sand tailing recovered from the bottom of the separation zone contained 0.35 weight percent bitumen, 59.83 weight percent water and 39.82 weight percent solids. Air content of the slurry as introduced into the body of water was 9 volume percent and no additional air was added in the separation zone.

While the invention has been described above with respect to a preferred embodiment thereof, it will be understood by those skilled in the art that various changes and modifications may be made without departing from the spirit and scope of the invention and it is intended to cover all such changes and modifications in the appended claims.

I claim:

1. In a process for the recovery of bitumen from bituminous sand containing the same in which an aqueous slurry of bituminous sand is introduced into a body of water in a separation zone so that bitumen floats to the top of the body of water in the form of bituminous froth for recovery therefrom while sand settles to the bottom thereof for removal therefrom, the improvement which comprises imparting shearing energy to said slurry in said separation zone in amounts sufficient to reduce at least about 80% of the bitumen particles contained in said slurry to a size in the range between about 50 and about 200 microns.

2. The process of claim 1 in which less than about 40% of the bitumen contained in the slurry prior to imparting shearing energy is in the form of particles in the 50–200 micron size range.

3. The process of claim 1 in which between about 200 and about 2,000 ft.-lbs. of shearing energy per pound of slurry is imparted to the slurry in the separation zone.

4. The process of claim 3 in which the shearing energy is imparted to the slurry during dispersion of the slurry in the body of water in the separation zone.

5. The process of claim 4 in which shearing energy is imparted to the slurry by dispersing same in the body of water through a high shear turbine impeller.

References Cited

UNITED STATES PATENTS

| 1,660,230 | 11/1925 | Monger | 210—49 |
| 1,947,704 | 2/1934 | Fisher | 252—349 |
| 2,338,986 | 1/1944 | Waterman | 252—349 |
| 3,159,562 | 9/1961 | Bichard et al. | 208—11 |

FOREIGN PATENTS

| 488,928 | 12/1952 | Canada | 208—11 |

OTHER REFERENCES

Pasternack et al.: "Oil Recovery from the Alberta Oil Sands by the Hot Water Washing Method," Proceedings—Athabasca Oil Sands Conference, 1951, pp. 200–203.

CURTIS R. DAVIS, Primary Examiner